United States Patent [19]

McKee

[11] Patent Number: 4,475,766
[45] Date of Patent: Oct. 9, 1984

[54] DRAINAGE SEAL FOR VEHICLE HAVING REMOVABLE ROOF PANELS

[75] Inventor: Gerald D. McKee, Highland, Mich.
[73] Assignee: Cars & Concepts, Inc., Brighton, Mich.
[21] Appl. No.: 497,147
[22] Filed: May 23, 1983
[51] Int. Cl.³ .............................................. B60J 7/08
[52] U.S. Cl. .................................. 296/213; 296/218; 49/476
[58] Field of Search ................. 296/213, 218; 49/465, 49/476, 475

[56] References Cited

U.S. PATENT DOCUMENTS

| | | | |
|---|---|---|---|
| 2,556,062 | 6/1951 | Buehrig | 296/213 |
| 4,120,529 | 10/1978 | Chrysler | 296/218 |
| 4,138,155 | 2/1979 | Chrysler | 296/218 |

OTHER PUBLICATIONS

1979 Chev. "Y," 14000316 GM Corp.

Primary Examiner—Robert R. Song
Attorney, Agent, or Firm—Brooks & Kushman

[57] ABSTRACT

A vehicle body (10) including a pair of roof panels (12) for closing associated roof openings (14) incorporates a pair of drainage seals (16) that direct water from the roof for downward drainage. Each drainage seal (16) includes a one piece resilient seal member (30) having a front seal portion (32), a U-shaped roof seal portion (34) extending around the associated roof opening, and a rear seal portion (36) extending along a rear pillar (26) of the vehicle body. The front seal portion (32) of each seal member includes a flap (38) that defines a drainage passage (40) through which the water flows, preferably in a hidden manner by tucking the flap under a flange (48) on the associated front pillar (22). The rear seal portion (36) of each seal member includes a channel (100) for carrying water directed thereto from the roof seal portion (34) of the seal member. Connector lugs (102,104) provide connections between the different seal portions of the seal member and are located on opposite sides of a roof panel seal that is mounted on the associated roof panel at its outboard edge.

8 Claims, 6 Drawing Figures

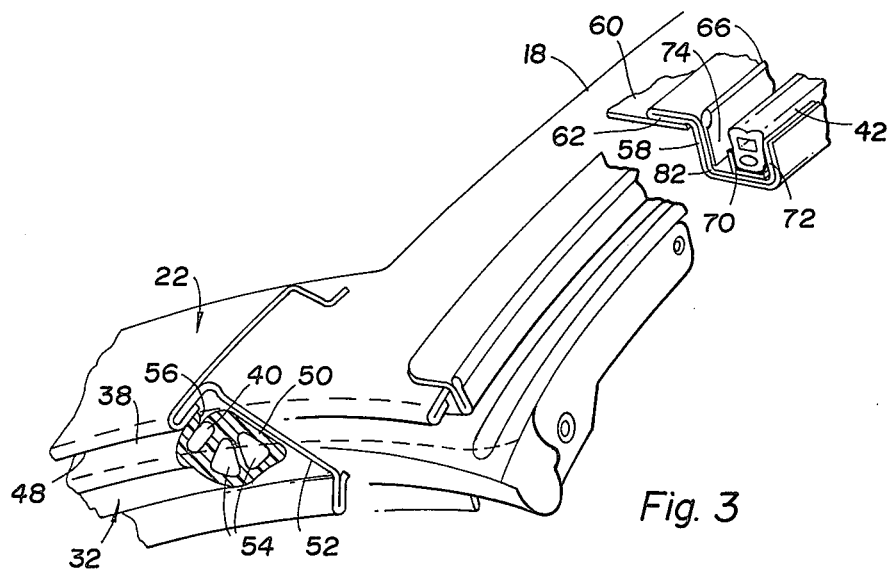
Fig. 3
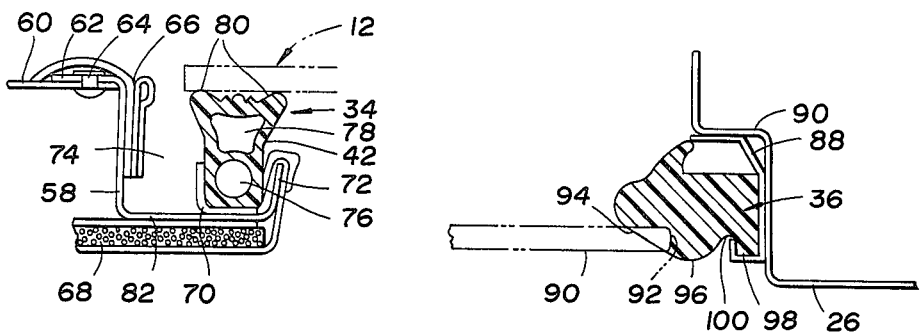
Fig. 4
Fig. 5
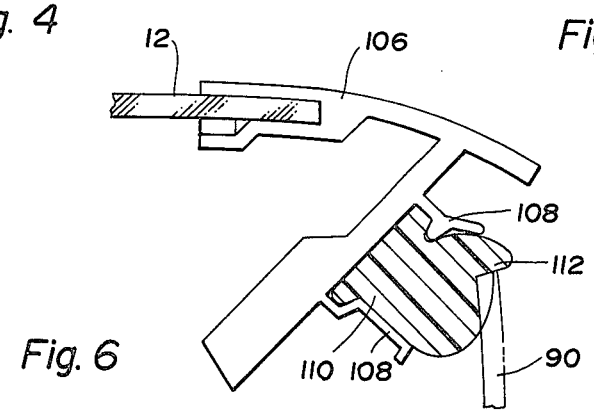
Fig. 6

DRAINAGE SEAL FOR VEHICLE HAVING REMOVABLE ROOF PANELS

TECHNICAL FIELD

This invention relates to a vehicle body construction including a pair of laterally oriented roof openings that are closed by a pair of removable roof panels and sealed by a pair of drainage seals respectively associated with the roof openings.

BACKGROUND ART

The prior art discloses vehicles that include a pair of laterally oriented roof openings which are selectively opened and closed by a pair of removable roof panels. The U.S. patent of Buehrig, U.S. Pat. No. 2,556,062, discloses a vehicle having such a removable roof panel construction. In the Buehrig patent, each roof opening also includes a seal that extends around the front, the inboard side, and the rear of the opening to provide sealing when the roof panel is closed. The inboard portions of the seals are located on opposite sides of a central strut that connects the vehicle windshield header with a rear portion of the roof. This strut is located between the roof openings and thereby provides structural rigidity to the vehicle while still permitting a convertible-like opening of the roof with the panels removed.

Prior two passenger vehicles manufactured by the General Motors Corporation of Detroit, Mich., in the United States of America, under the trademark CORVETTE have also included a pair of laterally oriented roof openings that are selectively opened and closed by a pair of removable panels. With such CORVETTE vehicles, the roof panels support seals that engage the front windshield header, the central strut between the roof openings, and the rear roof portion in order to provide a sealed relationship with the panels secured to the vehicle. With such a seal construction, any discontinuity in the sealed relationship of the seal can result in leakage that permits water entry into the vehicle.

U.S. Pat. No. 4,120,529, which is assigned to the assignee of the present invention, discloses a vehicle having a pair of laterally oriented roof openings that are selectively closed by a pair of removable panels and sealed by a pair of drainage seals that are mounted on the vehicle body rather than on the panels. Such a construction provides enhanced sealing since a small discontinuity in the sealed relationship of each seal with the roof panel does not result in leakage. Rather, the roof openings are bounded by channels partially defined by the seals such that water is directed toward the lateral outboard ends of the roof openings where the outboard edges of the closed roof panels are located. Such outboard ends of the channels are located approximately above the front seat occupant's lap and above the feet of any rear seat passenger in commercial vehicle that have been constructed in accordance with the teachings of this patent.

DISCLOSURE OF INVENTION

An object of the present invention is to provide an improved drainage seal for a vehicle having a pair of laterally oriented roof openings that are closed by a pair of removable roof panels.

The vehicle body in which the drainage seal is incorporated includes a front windshield header extending laterally with respect to the vehicle body and also includes a pair of front pillars that respectively support opposite ends of the windshield header. A rear roof portion that is spaced rearwardly from the windshield header extends laterally with respect to the vehicle body. A pair of rear pillars respectively support opposite lateral sides of the rear roof portion and may be embodied by either intermediate side pillars or rear sail-panel type pillars depending upon the particular body style of the vehicle. A central strut extends longitudinally between the windshield header and the rear roof portion to define a pair of roof openings that are oriented in opposite laterally opening directions. The pair of removable roof panels of the vehicle respectively close the pair of roof openings and are removed to provide opening thereof that provides a convertible-like vehicle.

A pair of drainage seals constructed in accordance with the invention are respectively associated with the pair of roof openings of the vehicle body and each comprises a one piece resilient seal member including front, roof, and rear seal portions. The front seal portion of the seal member extends along the associated front pillar and includes a flap that defines a water drainage passage. The roof seal portion of the seal member includes front, intermediate, and rear sections that cooperatively define a U shape extending around the associated roof opening and project upwardly to engage and seal against the associated roof panel. At the front side of each roof opening, the front section of the roof seal portion of the seal member is connected to the front seal portion of the seal member to direct water to the drainage passage thereof for downward flow. The front seal portion thus directs water away from above the lap of any front seat vehicle occupant seated below the roof opening. The rear seal portion of the seal member extends along the associated rear roof pillar and has an upper end connected to the rear section of the roof seal portion of the seal member.

In the preferred construction, each front pillar of the vehicle body includes an outboard flange associated with the flap on the front seal portion of the associated seal member. The seal member flap has a distal edge that is tucked under the associated front pillar flange. Such tucking of the flap encloses the drainage passage that directs water from the roof and thereby provides a hidden passage through which drainage water flows to the lower end of the front pillar where it merely drops downwardly between an associated vehicle door and front panel for eventual gravity flow onto the roadway.

In the preferred construction of the drainage seals, the rear seal portion of each seal member includes a channel for carrying water directed thereto from the rear section of the roof seal portion of the seal member. This channel of the rear seal portion preferably opens in an outboard direction and directs drainage water from the roof away from the area above the feet of a rear seat occupant.

Each seal member preferably includes first and second connector lugs, with the first connector lug connecting the front seal portion of the seal member to the front section of the roof seal portion of the seal member, and with the second connector lug connecting the rear seal portion of the seal member to the rear section of the roof seal portion of the seal member. These connector lugs are secured in any suitable manner to the associated seal portions such as by a vulcanizing process and thereby enable the different seal portions of the seal member to have different cross sections. Also, each roof panel includes an outboard window seal that extends between the associated pair of connector lugs with the roof panel closing the associate roof opening.

The objects, features, and advantages of the present invention are readily apparent from the following detailed description of the best mode for carrying out the invention when taken in connection with the accompanying drawings.

BRIEF DESCRIPTION OF DRAWINGS

FIG. 3 is a partially broken away perspective view illustrating the construction of a front pillar and a front seal portion of a seal member of each drainage seal;

FIG. 4 is a sectional view taken along the direction of line 4—4 in FIG. 2 and illustrates the cross section of each seal member along a roof seal portion which extends around the front, inboard side, and rear of the associated roof opening;

FIG. 5 is a sectional view taken along the direction of line 5—5 in FIG. 2 and illustrates the construction of a rear seal portion of each seal member; and FIG. 6 is a sectional view taken along the direction of line 6—6 in FIG. 2 and illustrates the construction of the associated removable roof panel at its outboard edge where a seal is located for sealing with the adjacent vehicle door window.

BEST MODE FOR CARRYING OUT THE INVENTION

Figure 1:
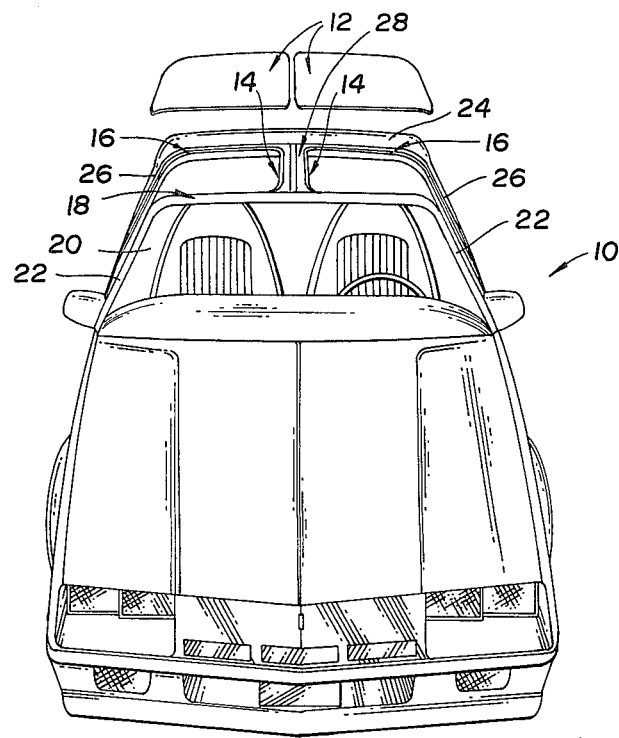
FIG. 1 is a front perspective view illustrating a vehicle whose body includes a pair of laterally oriented roof openings which are selectively closed by a pair of removable roof panels and sealed by a pair of drainage seals constructed in accordance with the present invention.
Figure 2:
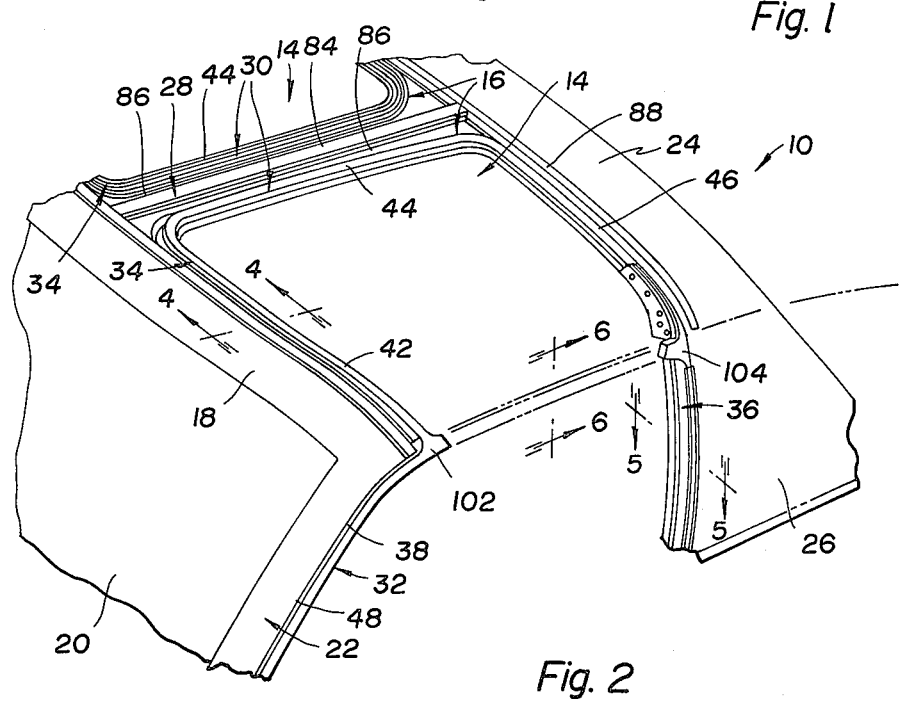
FIG. 2 is a partial perspective view of the vehicle body as seen from a front, outboard position above the vehicle and illustrates the roof opening and drainage seal construction.

With reference to FIGS. 1 and 2 of the drawings, the vehicle illustrated includes a vehicle body 10 having a pair of removable roof panels 12 for respectively closing a pair of roof openings 14. A pair of drainage seals 16 constructed in accordance with the present invention are respectively associated with the roof openings 14 to provide sealing thereof as well as directing rain or other water from the roof as is hereinafter more fully described.

With continued reference to FIGS. 1 and 2, the vehicle body 10 incorporating the drainage seals 16 is of the type including a front windshield header 18 that extends laterally with respect to the vehicle body at the top edge of its windshield 20. A pair of front pillars 22 respectively support opposite lateral ends of the windshield header 18 and are located at the opposite lateral edges of the windshield 20 just in front of the vehicle side door window openings. At the rear of the roof openings 14, the vehicle body includes a rear roof portion 24 spaced rearwardly from the windshield header 18 and extending laterally with respect to the vehicle body between its opposite sides. A pair of rear pillars 26 are illustrated in the form of sail-panels and respectively support opposite lateral sides of the rear roof portion 24 at the rear of the roof openings 14. A central strut 28 extends longitudinally between the windshield header 18 and the rear roof portion 24 to cooperate therewith in defining the front, inboard side, and rear of each roof opening 14.

As illustrated in FIG. 2, each drainage seal 16 comprises a one piece resilient seal member 30 made from a suitable rubber or rubber-like material and including a front seal portion 32, a roof seal portion 34, and a rear seal portion 36. As illustrated in FIG. 3, the front seal portion 32 of the seal member 30 extends along the associated front pillar 22 and includes a flap 38 that defines a water drainage passage 40. Roof seal portion 34 of each seal member 30 is illustrated in FIG. 2 as including a front section 42 extending alongside the windshield header 18, an intermediate section 44 extending along the central strut 28, and a rear section 46 extending alongside the rear roof portion 24. These front, intermediate, and rear sections cooperate to provide the roof seal portion 34 of each seal member 30 with a U shape extending around the associated roof opening 14 with a laterally opening orientation in an outboard direction. As illustrated in FIG. 4, each section of the roof seal portion 34 of the seal member projects upwardly to engage and seal against the associated roof panel 12 in the closed position. As is hereinafter more fully described, the front section 42 of the roof seal portion 34 of each seal member directs water to the front seal portion 32 of the seal member for flow through the drainage passage 40 thereof and exiting at the lower end of the associated front pillar 22. The rear seal portion 36 of the seal member extends along the associated rear pillar 26 and has an upper end connected to the rear section 46 of the roof seal portion 34 of the seal member 30.

As illustrated in FIG. 3, each front pillar 22 includes an outboard flange 48 extending alongside the front seal portion 32 of the seal member. This front seal portion 32 of the seal member includes a base wall 50 supported on a mounting wall 52 of the front pillar 22 in any suitable manner such as by an adhesive bond or by a suitable retaining strip, etc. Longitudinally extending openings 54 in the cross section of the front seal portion 32 decrease the material required to extrude or otherwise form the seal and also control the resiliency thereof during compression. Flap 38 of the front seal portion 32 includes a distal edge 56 that is tucked under the front pillar flange 48 so as to enclose the water drainage passage 40 which is thus hidden from sight while still providing for the downward flow of water from the roof portion of the seal.

With reference to FIG. 4, the front section 42 of the roof seal portion 34 of each seal member is mounted by a sheet metal support 58 on a front portion 60 of the roof just to the rear of the windshield header. Such a construction is utilized when a vehicle is retrofitted to include the pair of removable roof panels, as opposed to mounting the support 58 directly on the vehicle windshield header as can be done when the vehicle is initially manufactured to include a pair of removable roof panels. In both cases, the central strut that defines the pair of roof openings is always connected to the windshield header in order to provide reinforcement between the windshield header and the rear roof portion. However, retrofitting is more conveniently performed in the manner illustrated in FIG. 4 by initially cutting an opening in the roof just to the rear of the front roof portion 60. An upper leg 62 of the support 58 is engaged with the top surface of the front roof portion 60 and secured thereto by spaced rivots 64 which are covered by a trim assembly 66. Support 58 has a somewhat L shape depending downwardly from its leg 62 and is concealed from a vehicle occupant's sight by the headliner 68. A separate strip retainer 70 and a support leg 72 cooperate to secure and position the front section 42 of the roof seal portion of each seal member to the support 58 in a spaced relationship from the trim assembly 66 so as to define a channel 74. Front section 42 of the roof seal portion includes a lower round opening 76 and an upper opening 78 that reduce the material necessary to form the seal while also controlling the resiliency thereof when the roof panel 12 is closed and secured by suitable latch mechanisms. It will be noted that any water which collects in the channel 74 prior to downward drainage as previously described cannot enter the vehicle at the engaged sealing edges 80 since these sealing edges are spaced upwardly from the lower support wall 82 that defines the bottom of channel 74.

With reference to FIG. 2, the intermediate section 44 of the roof portion 34 of each seal member 30 is located on one side of a central sheet metal trim strip 84 which has a T shape under which the opposite inboard edges of each roof panel are positioned upon movement to the closed positions. Intermediate seal sections 44 project upwardly to define water channels 86 through which drainage water flows either forwardly or rearwardly depending upon the longitudinal position. Adjacent the rear roof portion 24, the rear section 46 of each roof seal portion 34 defines a channel 88 in a similar manner to that previously described in regard to the front section 42 illustrated in FIG. 4.

With reference to FIG. 5, the rear portion 36 of each seal member is secured by a strip retainer 88 to a flange 90 of the associated rear pillar 26. The side door window 90 has a rear edge 92 that engages a sealing surface 94 of the rear seal portion 38 upon door closing in order to provide a sealed condition. Just to the rear of the sealing surface 94, rear seal portion 36 includes an outward projection 96 that cooperates with a rear projection 98 to define a channel 100 for carrying water directed thereto from the rear section of the roof seal portion of the seal member. Channel 100 of the rear portion 36 of the seal member opens in an outboard direction and carries water downwardly away from the rear window edge 92 so as to permit flow thereof to the roadway without the possibility of entering the vehicle through the side door window.

As illustrated in FIG. 2, each seal member 30 includes first and second connector lugs 102 and 104. First connector 102 connects the upper end of the front seal portion 32 to the outboard end of the front section 42 of the roof seal portion 34 of each seal member. Second connector lug 104 connects the upper end of the rear seal portion 36 to the outboard end of the rear section 46 of the roof seal portion 34 of each seal member. The connections between the connector lugs 102 and 104 and the adjacent seal portions are preferably provided by a vulcanizing process or suitable adhesive bonding in order to provide a one piece seal construction.

With reference to FIG. 6, each removable roof panel 12 has an outboard edge including an edge extrusion 106 having retainers 108 for mounting an outboard window seal 110. Upon door closing, the upper edge 112 of the side door window 90 engages the seal 110 in order to provide a sealed relationship. Seal 110 extends between the connector lugs 102 and 104 of the associated drainage seal 30. Thus, the front and rear seal portions 32 and 36 illustrated in FIG. 2 seal against the front and rear edges of the side door window while the top edge 112 of the side door window seals against the seal 110 shown in FIG. 6 and extends between the connector lugs 102 and 104 shown in FIG. 2.

While the best mode for carrying out the invention has been described in detail, those familiar with the art to which this invention relates will recognize various alternative designs and embodiments for practicing the invention as defined in the following claims.

What is claimed is:

1. In a vehicle body including a front windshield header extending laterally with respect to the vehicle body, a pair of front pillars that respectively support opposite lateral ends of the windshield header, a rear roof portion that is spaced rearwardly from the windshield header and extends laterally with respect to the vehicle body, a pair of rear pillars that respectively support opposite lateral sides of the rear roof portion, a central strut that extends longitudinally between the windshield header and the rear roof portion to define a pair of roof openings, and a pair of removable roof panels for respectively closing the pair of roof openings, a pair of drainage seals respectively associated with the pair of roof openings and each comprising: a one piece resilient seal member including front, roof, and rear seal portions; the front seal portion of the seal member extending along the associated front pillar and including a flap that defines a water drainage passage; the roof seal portion of the seal member including front, intermediate, and rear sections that cooperatively define a U shape extending around the associated roof opening and projecting upwardly to engage and seal against the associated roof panel; the front section of the roof seal portion of the seal member being connected to the front seal portion of the seal member to direct water to the drainage passage thereof; and the rear seal portion of the seal member extending along the associated rear roof pillar and having an upper end connected to the rear section of the roof seal portion of the seal member.

2. A vehicle body as in claim 1 wherein each front pillar includes an outboard flange, and the flap on the front seal portion of each seal member having a distal edge that is tucked under the associated front pillar flange.

3. A vehicle body as in claim 1 or 2 wherein the rear seal portion of each seal member includes a channel for carrying water directed thereto from the rear section of the roof seal portion of the seal member.

4. A vehicle body as in claim 3 wherein the channel of the rear seal portion of each seal member opens in an outboard direction.

5. A vehicle body as in claim 4 wherein each seal member includes first and second connector lugs, the first connector lug connecting the front seal portion of the seal member to the front section of the roof seal portion of the seal member, the second connector lug connecting the rear seal portion of the seal member to the rear section of the roof seal portion thereof, and each roof panel including an outboard window seal that extends between the associated pair of connector lugs with the roof panel closing the associated roof opening.

6. In a vehicle body including a front windshield header extending laterally with respect to the vehicle body, a pair of front pillars that respectively support opposite lateral ends of the windshield header, a rear roof portion that is spaced rearwardly from the windshield header and extends laterally with respect to the vehicle body, a pair of rear pillars that respectively support opposite lateral sides of the rear roof portion, a central strut that extends longitudinally between the windshield header and the rear roof portion to define a pair of roof openings, and a pair of removable roof panels for respectively closing the pair of roof openings, a pair of drainage seals respectively associated with the pair of roof openings and each comprising: a one piece resilient seal member including front, roof, and rear seal portions; the front seal portion of the seal member extending along the associated front pillar and including a flap that defines a water drainage passage; the roof seal portion of the seal member including front, intermediate, and rear sections that cooperatively define a U shape extending around the associated roof opening and projecting upwardly to engage and seal against the associated roof panel; the front section of the roof seal portion of the seal member being connected to the front seal portion of the seal member to direct water to the drainage passage thereof; the rear seal portion of the seal member extending along the associated rear pillar and having an upper end connected to the rear section of the roof seal portion of the seal member; and the rear seal portion of the seal member including an outwardly opening channel for carrying water directed thereto from the rear section of the roof seal portion of the seal member.

7. In a vehicle body including a front windshield header extending laterally with respect to the vehicle body, a pair of front pillars that respectively support opposite lateral ends of the windshield header, a rear roof portion that is spaced rearwardly from the windshield header and extends laterally with respect to the vehicle body, a pair of rear pillars that respectively support opposite lateral sides of the rear roof portion, a central strut that extends longitudinally between the windshield header and the rear roof portion to define a pair of roof openings, and a pair of removable roof panels for respectively closing the pair of roof openings, a pair of drainage seals respectively associated with the pair of roof openings and each comprising: a one piece resilient seal member including front, roof, and rear seal portions; the front seal portion of the seal member extending along the associated front pillar and including a flap that defines a water drainage passage; the roof seal portion of the seal member including front, intermediate, and rear sections that cooperatively define a U shape extending around the associated roof opening and projecting upwardly to engage and seal against the associated roof panel; a first connector lug that connects the front section of the roof seal portion of the seal member to the front seal portion of the seal member to direct water to the drainage passage thereof; the rear seal portion of the seal member extending along the associated rear pillar; a second connector lug that connects the rear seal portion of the seal member to the rear section of the roof seal portion of the seal member; and the rear seal portion of the seal member including an outwardly opening channel for carrying water directed thereto from the rear section of the roof seal portion of the seal member.

8. In a vehicle body including a front windshield header extending laterally with respect to the vehicle body, a pair of front pillars that respectively support opposite lateral ends of the windshield header, each front pillar including an outboard flange, a rear roof portion that is spaced rearwardly from the windshield header and extends laterally with respect to the vehicle body, a pair of rear pillars that respectively support opposite lateral sides of the rear roof portion, a central strut that extends longitudinally between the windshield header and the rear roof portion to define a pair of roof openings, and a pair of removable roof panels for respectively closing the pair of roof openings, a pair of drainage seals respectively associated with the pair of roof openings and each comprising: a one piece resilient seal member including front, roof, and rear seal portions; the front seal portion of the seal member extending along the associated front pillar and including a flap that defines a water drainage passage; the flap having a distal edge that is tucked under the outboard flange of the associated front pillar to enclose the water drainage passage defined by the flap; the roof seal portion of the seal member including front, intermediate, and rear sections that cooperatively define a U shape extending around the associated roof opening and projecting upwardly to engage and seal against the associated roof panel; a first connector lug that connects the front section of the roof seal portion of the seal member to the front seal portion of the seal member to direct water to the drainage passage thereof; the rear seal portion of the seal member extending along the associated rear pillar; a second connector lug that connects the rear seal portion of the seal member to the rear section of the roof seal portion of the seal member; and the rear seal portion of the seal member including an outwardly opening channel for carrying water directed thereto from the rear section of the roof seal portion of the seal member.

* * * * *